United States Patent
Ikezawa et al.

(10) Patent No.: US 11,364,888 B2
(45) Date of Patent: Jun. 21, 2022

(54) DRIVING ASSISTANCE APPARATUS

(71) Applicant: Toyota Jidosha Kabushiki Kaisha, Toyota (JP)

(72) Inventors: Yuta Ikezawa, Susono (JP); Kohei Tochigi, Susono (JP); Shogo Ito, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 240 days.

(21) Appl. No.: 16/741,411

(22) Filed: Jan. 13, 2020

(65) Prior Publication Data
US 2020/0223410 A1 Jul. 16, 2020

(30) Foreign Application Priority Data
Jan. 15, 2019 (JP) .............................. JP2019-004190

(51) Int. Cl.
*B60T 8/1755* (2006.01)
*G05D 1/02* (2020.01)
*G06V 20/56* (2022.01)

(52) U.S. Cl.
CPC ........ *B60T 8/17555* (2013.01); *G05D 1/0223* (2013.01); *G06V 20/56* (2022.01); *G05D 2201/0213* (2013.01)

(58) Field of Classification Search
CPC .............. B60T 8/17555; G05D 1/0223; G05D 2201/0213; G06K 9/00791
See application file for complete search history.

(56) References Cited

U.S. PATENT DOCUMENTS

| 2010/0121549 A1* | 5/2010 | Fukuda ............... B60W 30/188 701/93 |
| 2015/0175160 A1* | 6/2015 | Sudou ................. B60W 30/09 701/70 |
| 2018/0178796 A1 | 6/2018 | Fukuda et al. |

FOREIGN PATENT DOCUMENTS

| JP | 2010-111350 A | 5/2010 |
| JP | 2015-120363 A | 7/2015 |
| JP | 2018-103833 A | 7/2018 |
| JP | 2018-131027 A | 8/2018 |

OTHER PUBLICATIONS

European Patent Office written opinion for EP 19220253, dated Jun. 2020; (Year: 2020).*

* cited by examiner

*Primary Examiner* — Calvin Cheung
(74) *Attorney, Agent, or Firm* — Dinsmore & Shohl LLP

(57) ABSTRACT

A driving assistance apparatus can execute deceleration assistance of decelerating a host vehicle independently of an operation by a driver. The driving assistance apparatus is provided with: an acquirer configured to obtain surrounding information associated with a surrounding situation of the host vehicle; and a controller programmed to reduce a deceleration assistance amount associated with the deceleration assistance when execution of the deceleration assistance is released. The controller is programmed to quickly reduce the deceleration assistance amount when execution of the deceleration assistance is released, if a surrounding situation indicated by the obtained surrounding information is a first situation in which the host vehicle can be required to accelerate, in comparison with a second situation in which the host vehicle cannot be required to accelerate.

3 Claims, 2 Drawing Sheets

DRIVING ASSISTANCE APPARATUS

CROSS-REFERENCE TO RELATED APPLICATIONS

This application is based upon and claims the benefit of priority of the prior Japanese Patent Application No. 2019-004190, filed on Jan. 15, 2019, the entire contents of which are incorporated herein by reference.

BACKGROUND

1. Technical Field

Embodiments of the present disclosure relate to a driving assistance apparatus, and particularly relate to a driving assistance apparatus configured to provide deceleration assistance.

2. Description of the Related Art

For this type of apparatus, for example, there is proposed an apparatus configured to perform a deceleration control on a host vehicle if it is determined that it is a situation in which the host vehicle is to be decelerated or stopped (refer to Japanese Patent Application Laid Open No. 2018-131027 (Patent Literature 1)).

A driving environment of the host vehicle changes every second. For example, after the deceleration control is executed due to a reduction in a following distance to a preceding vehicle that travels ahead of the host vehicle, the preceding vehicle may make a lane change. In this case, a driver of the host vehicle possibly steps on an accelerator pedal so as to accelerate the host vehicle. At this time, execution of the deceleration control is released due to the lane change of the preceding vehicle, but depending on how to release the deceleration control, the release of execution of the deceleration control is delayed from the driver's intention, and the driver may feel discomfort, which is problematic. A technology/technique described in the Patent Literature 1 cannot solve the problem.

SUMMARY

In view of the aforementioned problem, it is therefore an object of embodiments of the present disclosure to provide a driving assistance apparatus configured to appropriately release execution of a deceleration control.

The above object of embodiments of the present disclosure can be achieved by a driving assistance apparatus configured to execute deceleration assistance of decelerating a host vehicle independently of an operation by a driver, the driving assistance apparatus provided with: an acquirer configured to obtain surrounding information associated with a surrounding situation of the host vehicle; and a controller programmed to reduce a deceleration assistance amount associated with the deceleration assistance when execution of the deceleration assistance is released, wherein the controller is programmed to quickly reduce the deceleration assistance amount when execution of the deceleration assistance is released, if a surrounding situation indicated by the obtained surrounding information is a first situation in which the host vehicle can be required to accelerate, in comparison with a second situation in which the host vehicle cannot be required to accelerate.

DETAILED DESCRIPTION OF THE EMBODIMENT

A driving assistance apparatus according to an embodiment of the present disclosure will be explained with reference to FIG. 1 and FIG. 2.

(Configuration)

A configuration of the driving assistance apparatus according the embodiment will be explained with reference to FIG. 1. FIG. 1 is a block diagram illustrating the configuration of the driving assistance apparatus according to the embodiment.

Figure 1:
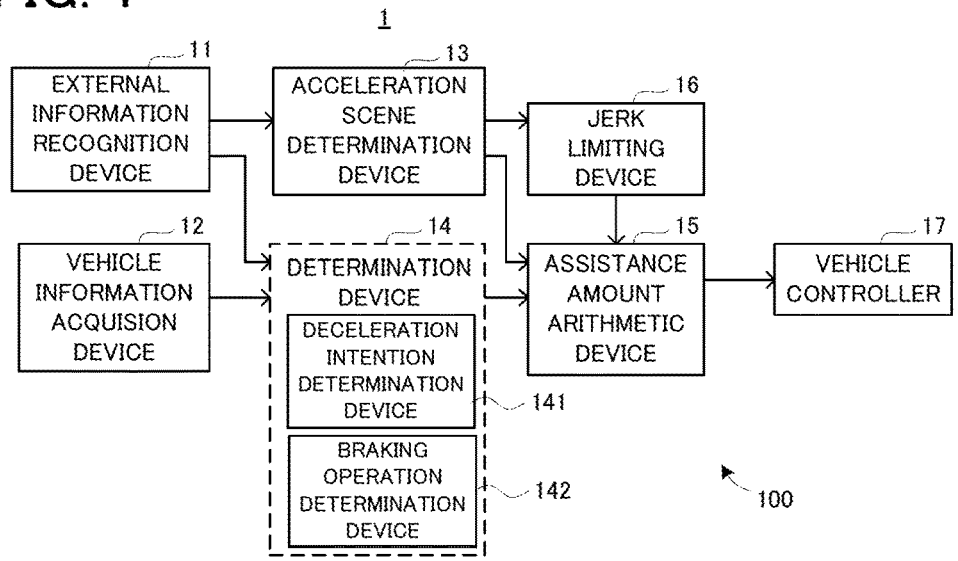
FIG. 1 is a block diagram illustrating a configuration of a driving assistance apparatus according to an embodiment.

In FIG. 1, a driving assistance apparatus 100 is mounted on a vehicle 1. The driving assistance apparatus 100 is configured to assist a driver of the vehicle 1 in driving. The driving assistance apparatus 100 is particularly configured to perform a deceleration assistance control of assisting the driver in decelerating the vehicle 1.

The driving assistance apparatus 100 is provided with an external information recognition device 11, a vehicle information acquisition device 12; an acceleration scene determination device 13, a determination device 14, an assistance amount arithmetic device 15, a jerk limiting device 16, and a vehicle controller 17, so as to realize the deceleration assistance control.

The external information recognition device 11 is configured to recognize a surrounding situation of the vehicle 1 and to obtain surrounding information (or external information) associated with the surrounding situation, on the basis of an output (and also information obtained by road-vehicle communication and vehicle-vehicle communication) of a device configured to detect an external situation of the vehicle 1, such as, for example, a millimeter wave radar, a camera, and light detection and ranging (LiDAR). A detailed explanation of a method of recognizing the surrounding situation will be omitted because various existing aspects can be applied thereto.

The vehicle information acquisition device 12 is configured to obtain vehicle information, which indicates a state of the vehicle 1, from an output of a device configured to detect the state of the vehicle 1, such as, for example, a vehicle wheel speed sensor, an accelerator pedal sensor, a brake pedal sensor, and a steering angle sensor. A detailed explanation of a method of obtaining the vehicle information will be omitted because various existing aspects can be applied thereto.

Now, an explanation will be given to conditions that allow the deceleration assistance control to be executed. In the embodiment, the deceleration assistance control may be executed when the following five conditions are satisfied: (i) a deceleration target associated with the deceleration assistance control is recognized, (ii) a distance between the vehicle 1 and the recognized deceleration target (or time to collision (TTC)) is less than or equal to a predetermined distance (or a predetermined time), (iii) the driver releases an accelerator pedal, (iv) the driver releases a brake pedal, and (v) a speed of the vehicle 1 is greater than or equal to a target speed, which is determined by the recognized deceleration target.

Here, the "deceleration target" is something that requires the vehicle 1 to decelerate or stop. Specifically, an example includes: an obstacle, such as, for example, another vehicle, a pedestrian, and a structure; something that restricts travel of the vehicle 1, such as, for example, a road sign, a red light, and a stop line; and a road structure, such as, for example, an intersection and a curve.

Execution of the deceleration assistance control is released (or ended) when any of the aforementioned conditions (i) to (v) is no longer satisfied. Here, the condition (i) may be no longer satisfied, for example, when a preceding vehicle, which is the deceleration target, makes a lane change, and when a red light, which is the deceleration target, is changed to green. Moreover, the condition (ii) may be no longer satisfied, for example, when acceleration of a preceding vehicle, which is the deceleration target, increases a distance from the vehicle 1 to the preceding vehicle.

The acceleration scene determination device 13 is configured to determine whether or not the surrounding situation of the vehicle 1 is a situation in which the vehicle 1 can be required to accelerate (hereinafter referred to an "acceleration scene" as occasion demands), on the basis of the surrounding information outputted from the external information recognition device 11 when the deceleration assistance control is executed. Specifically, for example, the acceleration scene determination device 13 may determine that it is the acceleration scene if the surrounding situation of the vehicle 1, which is recognized on the basis of the surrounding information, corresponds to the acceleration scene determined in advance when the deceleration assistance control is executed, and the acceleration scene determination device 13 may determine that it is not the acceleration scene if the surrounding situation of the vehicle 1, which is recognized on the basis of the surrounding information, does not correspond to the acceleration scene determined in advance.

The acceleration scene may include the following situations: for example, when a preceding vehicle, which is the deceleration target, makes a lane change, when acceleration of a preceding vehicle, which is the deceleration target, increases a distance from the vehicle 1 to the preceding vehicle, when a red light, which is the deceleration target, is changed to green (i.e., when the color of the traffic light is changed), when a curve road on which the vehicle 1 travels changes to a straight road ahead of the vehicle 1, and similar cases. The acceleration scene is not limited to these examples, but may be set appropriately.

Referring to the case of "when a preceding vehicle makes a lane change" as the acceleration scene, it may be determined that it is the "acceleration scene: when preceding vehicle makes a lane change", for example, if an indicator lamp on one of left and right sides of the preceding vehicle flashes on and off and if there is no vehicle on an adjacent traffic lane on the one of left and right sides, even though the preceding vehicle does not actually complete the lane change.

The determination device 14 is configured to determine whether or not the aforementioned five conditions that allow the deceleration assistance control to be executed are satisfied. When the driver releases the accelerator pedal and the brake pedal (i.e., when out of the five conditions, the condition "(iii) the driver releases the accelerator pedal" and the condition "(iv) the driver releases the brake pedal" are satisfied), the determination device 14 may particularly determine whether or not the remaining three conditions out of the five conditions are satisfied.

A deceleration intention determination device 141 of the determination device 14 is configured to determine that the driver has a deceleration intention if it is determined that the five conditions are satisfied due to an operation of releasing the accelerator pedal. A braking operation determination device 142 of the determination device 14 is configured to determine that it is "when there is no brake operation" in which it is necessary to execute the deceleration assistance control", if it is determined that the five conditions are satisfied due to an operation of releasing the brake pedal.

At least one of the deceleration intention determination device 141 and the braking operation determination device 142 may determine that the condition "(iii) the driver releases the accelerator pedal" is satisfied, when the following conditions (a) and/or (b) are satisfied, in addition to when the driver releases the accelerator pedal; namely, (a) the driver's line of sight is on the deceleration target (i.e., the driver gazes at the deceleration target) and/or (b) the driver's brain waves correspond to brain waves that are peculiar to deceleration actions. In the same manner, at least one of the deceleration intention determination device 141 and the braking operation determination device 142 may determine that the condition "(iv) the driver releases the brake pedal" is satisfied, when the above conditions (a) and/or (b) are satisfied, in addition to when the driver releases the brake pedal. By virtue of such a configuration, it is possible to improve determination accuracy for the conditions (iii) and (iv). As a result, it is possible to improve the accuracy of the determination that the "driver has a deceleration intention" by the deceleration intention determination device 141, and/or the accuracy of the determination that "it is "when there is no brake operation", in which it is necessary to execute the deceleration assistance control" by the braking operation determination device 142.

The assistance amount arithmetic device 15 is configured to arithmetically operate a deceleration assistance amount associated with the deceleration assistance control (corresponding to deceleration caused by the deceleration assistance control) when the deceleration assistance control is executed. A detailed explanation of a method of arithmetically operating the deceleration assistance amount will be omitted because various existing aspects can be applied thereto.

The jerk limiting device 16 is configured to determine a limit of jerk when execution of the deceleration assistance control is released. Since there is the limit of the jerk, the deceleration assistance amount is gradually reduced when execution of the deceleration assistance control is released. Particularly in the embodiment, the jerk limiting device 16 may mitigate the limit of the jerk if it is determined by the acceleration scene determination device 13 that it is the acceleration scene, in comparison with a situation in which it is determined that it is not the acceleration scene. For example, if the jerk is limited by using an upper value of the jerk, an upper value of the jerk when it is determined that it is the acceleration scene is greater than those when it is determined that it is not the acceleration scene. As a result, if it is determined that it is the acceleration scene, the deceleration assistance amount is quickly reduced (i.e., execution of the deceleration assistance control is quickly released), in comparison with the situation in which it is determined that it is not the acceleration scene.

The vehicle controller 17 is programmed or configured to control the vehicle 1 so as to realize target deceleration corresponding to the deceleration assistance amount arithmetically operated by the assistance amount arithmetic device 15. For example, the vehicle controller 17 may control a brake actuator, change an engine output, or perform a regenerative control on a motor.

(Operations)

Next, with reference to a flowchart in FIG. 2, an explanation will be given to operations of the driving assistance apparatus 100.

Figure 2:
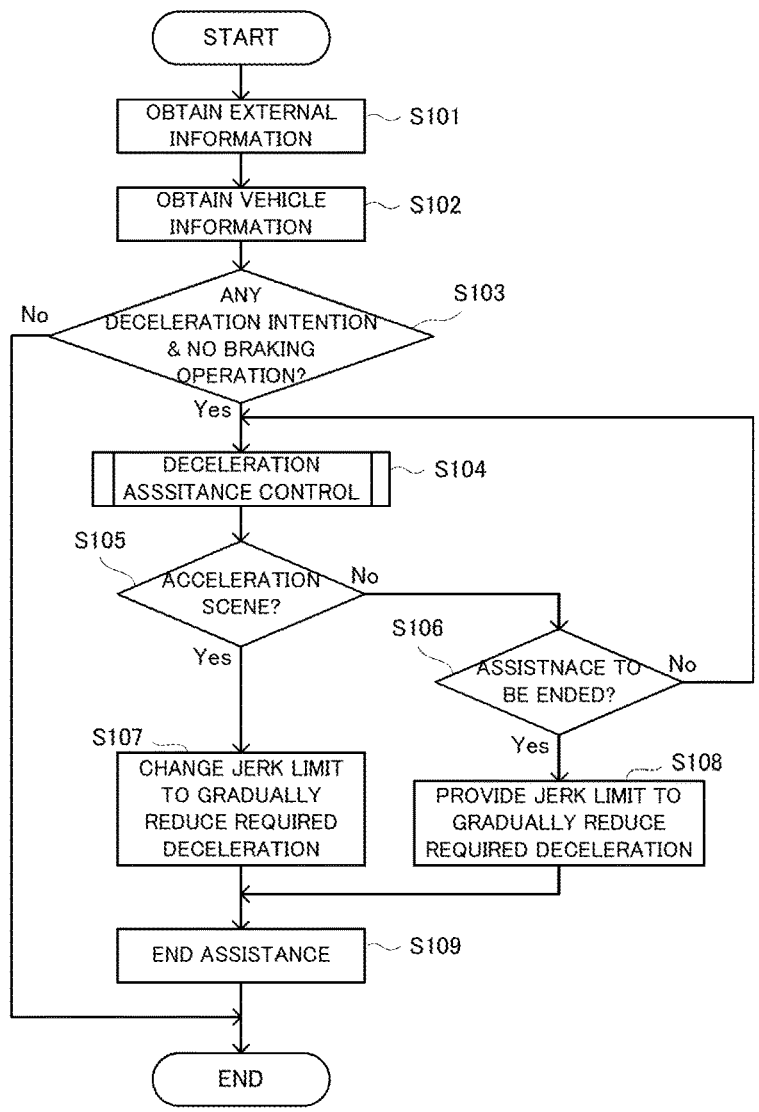
FIG. 2 is a flowchart illustrating a flow of operations of the driving assistance apparatus according to the embodiment.

In FIG. 2, the external information recognition device 11 of the driving assistance apparatus 100 obtains the surrounding information (or external information) (step S101). In parallel with the step S101, the vehicle information acquisition device 12 obtains the vehicle information (step S102).

Then, the deceleration intention determination device 141 and the braking operation determination device 142 of the determination device 14 respectively determine whether or not the driver has a deceleration intention and whether or not there is no brake operation (step S103). In the step S103, if it is determined that the driver has no deceleration intention, and/or if it is determined that there is a brake operation (the step S103: No), the operations illustrated in FIG. 2 are temporarily ended. It is because this is when the five conditions that allow the deceleration assistance control to be executed are not satisfied. Then, after a lapse of a predetermined time (e.g., several ten milliseconds to several hundred milliseconds), the step S101 is performed again. In other words, the operations illustrated in FIG. 2 are repeated with a period corresponding to the predetermined time.

In the step S103, if it is determined that the driver has a deceleration intention and if it is determined that there is no brake operation (the step S103: Yes), the deceleration assistance control is executed (step S104). At this time, the assistance amount arithmetic device 15 arithmetically operates the deceleration assistance amount.

When the deceleration assistance control is executed, the acceleration scene determination device 13 determines whether or not the surrounding situation of the vehicle 1 is the acceleration scene (step S105). In the step S105, if it is determined that it is the acceleration scene (the step S105: Yes), the assistance amount arithmetic device 15 performs a process to release execution of the deceleration assistance control. It is because if it is determined that it is the acceleration scene, for example, due to that a preceding vehicle makes a lane change or due to that a red light is changed to green, then, out of the five conditions that allow the deceleration assistance control to be executed, at least the condition "(i) the deceleration target associated with the deceleration assistance control is recognized" is no longer satisfied and execution of the deceleration assistance control is released. Alternatively, it is because if it is determined that it is the acceleration scene, for example, due to that acceleration of a preceding vehicle increases a distance from the vehicle 1 to the preceding vehicle, then, our of the aforementioned five conditions, the condition "(ii) the distance between the vehicle 1 and the recognized deceleration target is less than or equal to the predetermined distance" is no longer satisfied and execution of the deceleration assistance control is released.

At this time, the jerk limiting device 16 may determine the limit of the jerk, which is mitigated in comparison with those when it is determined that it is not the acceleration scene. The assistance amount arithmetic device 15 arithmetically operates the deceleration assistance amount so as to gradually reduce the deceleration assistance amount in accordance with the limit of the jerk determined by the jerk limiting device 16 (step S107).

Then, the vehicle controller 17 controls the vehicle 1 so as to realize the target deceleration corresponding to the deceleration assistance amount arithmetically operated by the assistance amount arithmetic device 15. As a result, execution of the deceleration assistance control is released (or ended) (step S109).

In the step S105, if it is determined that it is not the acceleration scene (the step S105: No), it is determined whether or not execution of the deceleration assistance control is to be released (or ended) (step S106). Specifically, it may be determined whether or not at least one of the five conditions that allow the deceleration assistance control to be executed is no longer satisfied. The step S106 may be performed by the determination device 14, or by the assistance amount arithmetic device 15.

In the step S106, if it is determined that execution of the deceleration assistance control is not to be released (the step S106: No), execution of the deceleration assistance control is continued. On the other hand, in the step S106, if it is determined that execution of the deceleration assistance control is to be released (the step S106: Yes), the assistance amount arithmetic device 15 performs a process to release execution of the deceleration assistance control. At this time, the jerk limiting device 16 may determine the limit of the jerk, which is strengthened in comparison with those when it is determined that it is the acceleration scene. The assistance amount arithmetic device 15 arithmetically operates the deceleration assistance amount so as to gradually reduce the deceleration assistance amount in accordance with the limit of the jerk determined by the jerk limiting device 16 (step S108).

(Technical Effect)

If the surrounding situation of the vehicle 1 is the acceleration scene, the driver highly likely steps on the accelerator pedal, in comparison with the situation in which the surrounding situation is not the acceleration scene. At this time, if it takes a relatively long time to release execution of the deceleration assistance control, the vehicle 1 may not accelerate as expected by the driver, even though the driver steps on the accelerator pedal. As a result, the driver may feel slow acceleration.

On the driving assistance apparatus 100, if the surrounding situation of the vehicle 1 is the acceleration scene, the limit of the jerk is mitigated in comparison with the situation in which the surrounding situation is not the acceleration scene. As a result, if the surrounding situation is the acceleration scene, the deceleration assistance amount when execution of the deceleration assistance control is released is quickly reduced (i.e., the time required to release execution of the deceleration assistance control is reduced), in comparison with the situation in which the surrounding situation is not the acceleration scene. Thus, according to the driving assistance apparatus 100, it is possible to prevent the driver from feeling the slow acceleration.

First Modified Example

When it is determined that the surrounding situation of the vehicle 1 is the acceleration scene and when the deceleration target associated with the deceleration assistance control is another vehicle (i.e., a preceding vehicle) that travels ahead of the vehicle 1, the jerk limiting device 16 may mitigate the limit of the jerk, in comparison with the situation in which it is determined that it is not the acceleration scene. Wherein the jerk limiting device 16 may increase an extent of mitigating the limit of the jerk (i.e., may mitigate it more), if a distance between the vehicle 1 and the other vehicle is long, in comparison with a situation in which the distance is short.

Second Modified Example

When it is determined that the surrounding situation of the vehicle 1 is the acceleration scene, the jerk limiting device 16 may change the extent of mitigating the limit of the jerk in accordance with a probability of acceleration of the vehicle 1 (in other words, a probability that the driver steps on the accelerator pedal).

Figure 3A:
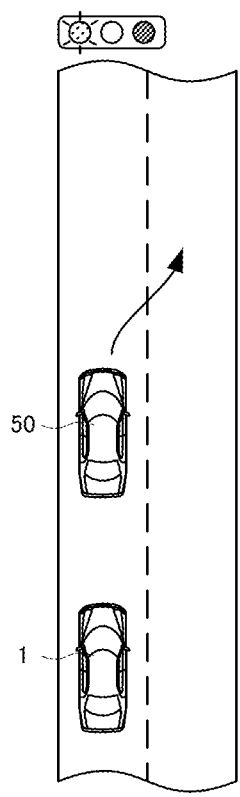
FIG. 3A is a diagram illustrating an example of a surrounding situation according to a second modified example.
Figure 3B:
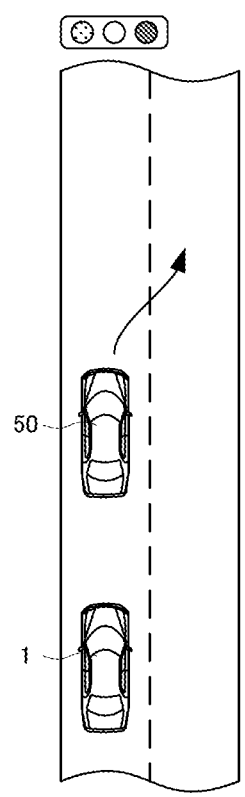
FIG. 3B is a diagram illustrating an example of the surrounding situation according to the second modified example.
Figure 3C:
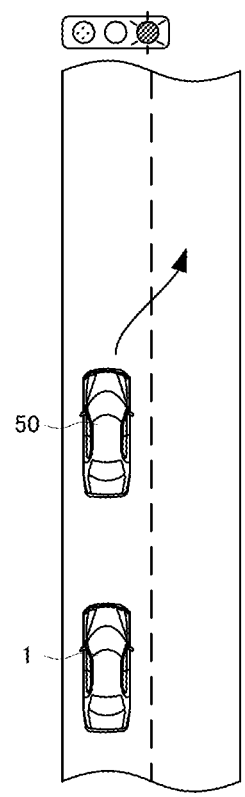
FIG. 3C is a diagram illustrating an example of the surrounding situation according to the second modified example.

Here, a specific explanation will be given to the situation in which it is determined that the surrounding situation of the vehicle 1 is the acceleration scene due to that another vehicle 50 (i.e., a preceding vehicle) that travels ahead of the vehicle 1 makes a lane change, as illustrated in FIG. 3A to FIG. 3C.

FIG. 3A illustrates a situation in which another vehicle 50 makes a lane change when the driving assistance apparatus 100 recognizes that the color of a traffic light ahead of the vehicle 1 is green (or that there is no traffic light). FIG. 3B illustrates a situation in which another vehicle 50 makes a lane change when the driving assistance apparatus 100 recognizes that there is a traffic light ahead of the vehicle 1, but cannot recognize the color of the traffic light. FIG. 3C illustrates a situation in which another vehicle 50 makes a lane change when the driving assistance apparatus 100 recognizes that the color of a traffic light ahead of the vehicle 1 is red.

Comparing the situations illustrated in FIG. 3A, FIG. 3B, and FIG. 3C with each other, the probability of acceleration of the vehicle 1 is the highest in the situation illustrated in FIG. 3A, and is the lowest in the situation illustrated in FIG. 3C. It is because in the situation illustrated in FIG. 3A, after another vehicle 50 makes a lane change, there is nothing that requires the vehicle 1 to decelerate or stop, and the driver highly likely steps on the accelerator pedal. Moreover, in the situation illustrated in FIG. 3C, even after another vehicle 50 makes a lane change, the driver less likely steps on the accelerator pedal, due to the traffic light in red color (i.e., a red light). In the situation illustrated in FIG. 3B, the probability that the driver steps on the accelerator pedal may change due to the color of the traffic light, but another vehicle 50 makes a lane change. Thus, the probability that the driver steps on the accelerator pedal may be higher than those in the situation illustrated in FIG. 3C.

In the situation illustrated in FIG. 3A, the jerk limiting device 16 may mitigate the limit of the jerk, in comparison with the situation in which it is determined that the surrounding situation of the vehicle 1 is not the acceleration scene and the situations illustrated in FIG. 3B and FIG. 3C. In the situation illustrated in FIG. 3B, the jerk limiting device 16 may mitigate the limit of the jerk, in comparison with the situation in which it is determined that the surrounding situation of the vehicle 1 is not the acceleration scene and the situation illustrated in FIG. 3C, but the extent of the mitigation may be smaller than those in the situation illustrated in FIG. 3A. In the situation illustrated in FIG. 3C, the jerk limiting device 16 may not mitigate the limit of the jerk, in comparison with the situation in which it is determined that the surrounding situation of the vehicle 1 is not the acceleration scene.

Various aspects of embodiments of the present disclosure derived from the embodiment and modified examples explained above will be explained hereinafter.

A driving assistance apparatus according to an aspect of embodiments of the present disclosure is a driving assistance apparatus configured to execute deceleration assistance of decelerating a host vehicle independently of an operation by a driver, the driving assistance apparatus provided with: an acquirer configured to obtain surrounding information associated with a surrounding situation of the host vehicle; and a controller programmed to reduce a deceleration assistance amount associated with the deceleration assistance when execution of the deceleration assistance is released, wherein the controller is programmed to quickly reduce the deceleration assistance amount when execution of the deceleration assistance is released, if a surrounding situation indicated by the obtained surrounding information is a first situation in which the host vehicle can be required to accelerate, in comparison with a second situation in which the host vehicle cannot be required to accelerate. In the aforementioned embodiment, the external information recognition device 11 corresponds to an example of the acquirer, and the assistance amount arithmetic device 15 and the jerk limiting device 16 correspond to an example of the controller.

The driving assistance apparatus is configured to execute the deceleration assistance due to a deceleration target associated with the deceleration assistance that requires the host vehicle to decelerate or stop. On the other hand, execution of the deceleration assistance may be released, for example, when the speed of the host vehicle reaches a target speed, when the driver performs an operation of the accelerator pedal or the brake pedal, when the surrounding situation of the host vehicle changes (e.g., when a preceding vehicle, which is the deceleration target, makes a lane change, when acceleration of a preceding vehicle, which is the deceleration target, increases a distance from the host vehicle to the preceding vehicle, when a red light, which is the deceleration target, is changed to green, etc.) or in similar cases.

The controller is programmed or configured to reduce the deceleration assistance amount associated with the deceleration assistance when execution of the deceleration assistance is released. At this time, it is desirable that the deceleration assistance amount is gradually reduced. By virtue of such a configuration, it is possible to prevent the ride comfort of the host vehicle from deteriorating due to the release of the deceleration assistance.

Particularly in the driving assistance apparatus, the controller may quickly reduce the deceleration assistance amount when execution of the deceleration assistance is released, if the surrounding situation is the first situation in which the host vehicle can be required to accelerate, in comparison with the second situation in which the host vehicle cannot be required to accelerate.

Here, if the surrounding situation is the first situation, a possibility that the driver steps on the accelerator pedal is higher than those when the surrounding situation is the second situation. At this time, if it takes a relatively long time to release execution of the deceleration assistance (i.e., to set the deceleration assistance amount to zero), the host vehicle may not accelerate as expected by the driver, even though the driver steps on the accelerator pedal. As a result, the driver may feel slow acceleration.

On the driving assistance apparatus, however, as described above, if the surrounding situation is the first situation, the deceleration assistance amount is quickly reduced when execution of the deceleration assistance is released (i.e., the time required to release execution of the deceleration assistance is reduced), in comparison with the second situation. Thus, according to the driving assistance apparatus, it is possible to appropriately release execution of the deceleration assistance while preventing the driver from feeling the slow acceleration.

In an aspect of the driving assistance apparatus, the controller is programmed to gradually reduce the deceleration assistance amount so as to satisfy a predetermined jerk limit when execution of the deceleration assistance is released, and the controller is programmed to quickly reduce the deceleration assistance amount when execution of the deceleration assistance is released, by mitigating the predetermined jerk limit if the surrounding situation indicated by the obtained surrounding information is the first situation, in comparison with the second situation. According to this aspect, it is possible to quickly reduce the deceleration assistance amount when execution of the deceleration assistance is released, relatively easily. The "limit of the jerk" in the aforementioned embodiment corresponds to an example of the jerk limit.

In this aspect, when a deceleration target associated with the deceleration assistance that requires the host vehicle to decelerate or stop is another vehicle that travels ahead of the host vehicle, the controller may be programmed to increase an extent of mitigating the predetermined jerk limit if a distance between the host vehicle and the other vehicle is long, in comparison with a situation in which the distance is short.

Even when the surrounding situation is the first situation (i.e., a situation in which the host vehicle can be required to accelerate), if the distance between the host vehicle and the other vehicle is relatively short, there is a relatively small possibility that the driver of the host vehicle immediately steps on the accelerator pedal. On the other hand, if the distance between the host vehicle and the other vehicle is relatively long, there is a relatively high possibility that the driver of the host vehicle immediately steps on the accelerator pedal.

If the extent of mitigating the predetermined jerk limit is increased when the surrounding situation is the first situation and when the distance between the host vehicle and the other vehicle is long, in comparison with the situation in which the distance is short, then, it is possible to reduce the time required to release execution of the deceleration assistance. In other words, it is possible to further prevent the driver from feeling the slow acceleration. On the other hand, if the extent of mitigating the predetermined jerk limit is reduced when the surrounding situation is the first situation and when the distance between the host vehicle and the other vehicle is short, in comparison with the situation in which the distance is long, then, it is possible to prevent the ride comfort of the host vehicle from deteriorating due to the release of execution of the deceleration assistance.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus configured to execute deceleration assistance of decelerating a host vehicle independently of an operation by a driver, said driving assistance apparatus comprising:

an acquirer configured to obtain surrounding information associated with a surrounding situation of the host vehicle; and a controller programmed to reduce a deceleration assistance amount associated with the deceleration assistance when execution of the deceleration assistance is released, wherein said controller is programmed to quickly reduce the deceleration assistance amount when execution of the deceleration assistance is released, if a surrounding situation indicated by the obtained surrounding information is a first situation in which the host vehicle can be required to accelerate, in comparison with a second situation in which the host vehicle cannot be required to accelerate.

2. The driving assistance apparatus according to claim 1, wherein said controller is programmed to gradually reduce the deceleration assistance amount so as to satisfy a predetermined jerk limit when execution of the deceleration assistance is released, and said controller is programmed to quickly reduce the deceleration assistance amount when execution of the deceleration assistance is released, by mitigating the predetermined jerk limit if the surrounding situation indicated by the obtained surrounding information is the first situation, in comparison with the second situation.

3. The driving assistance apparatus according to claim 2, wherein when a deceleration target associated with the deceleration assistance that requires the host vehicle to decelerate or stop is another vehicle that travels ahead of the host vehicle, said controller is programmed to increase an extent of mitigating the predetermined jerk limit if a distance between the host vehicle and the other vehicle is long, in comparison with a situation in which the distance is short.

* * * * *